Figure 3:
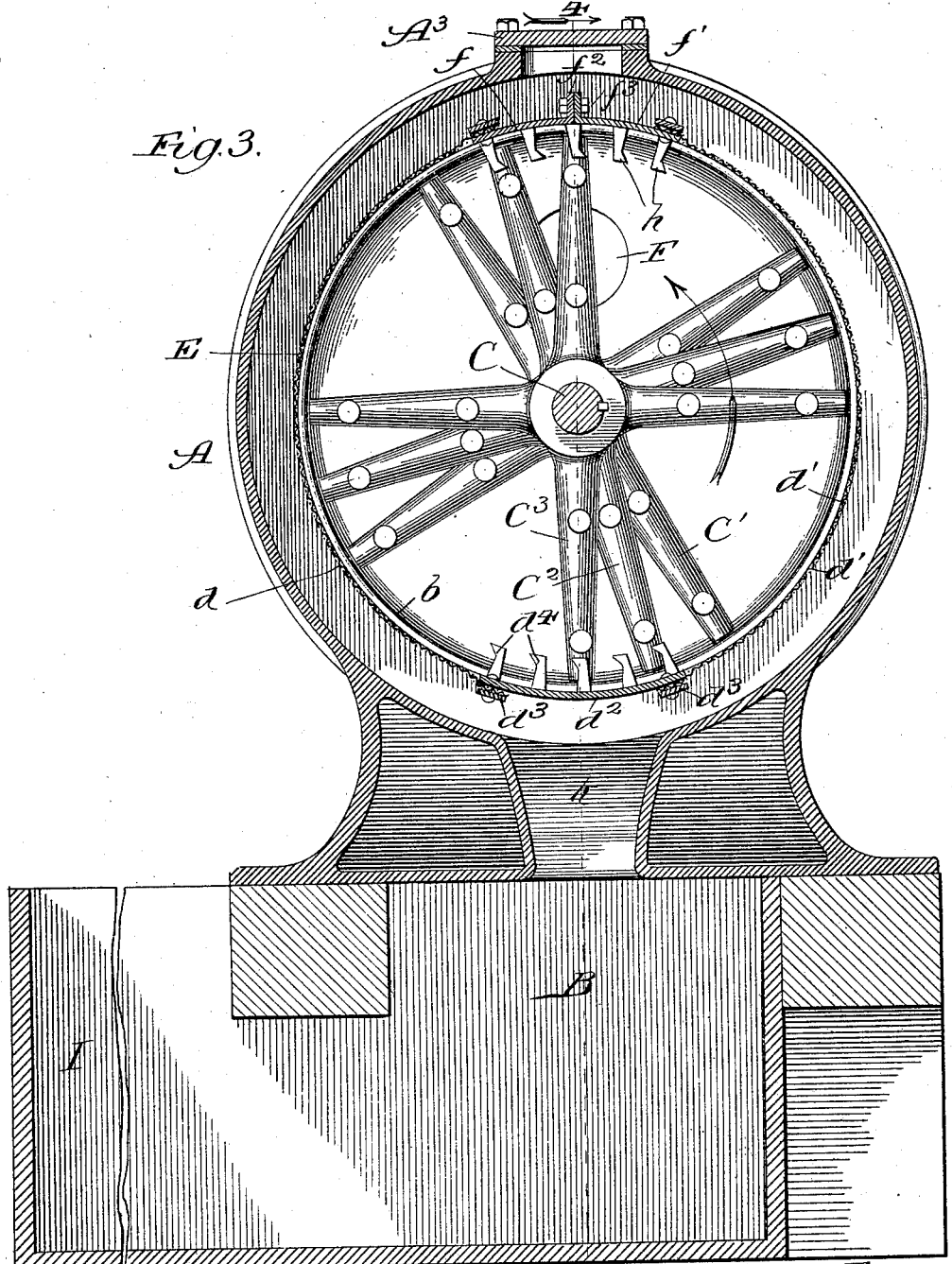

No. 683,256. Patented Sept. 24, 1901.
J. W. DRUITT.
PULVERIZING MILL.
(Application filed July 14, 1900.)
(No Model.) 3 Sheets—Sheet 1.
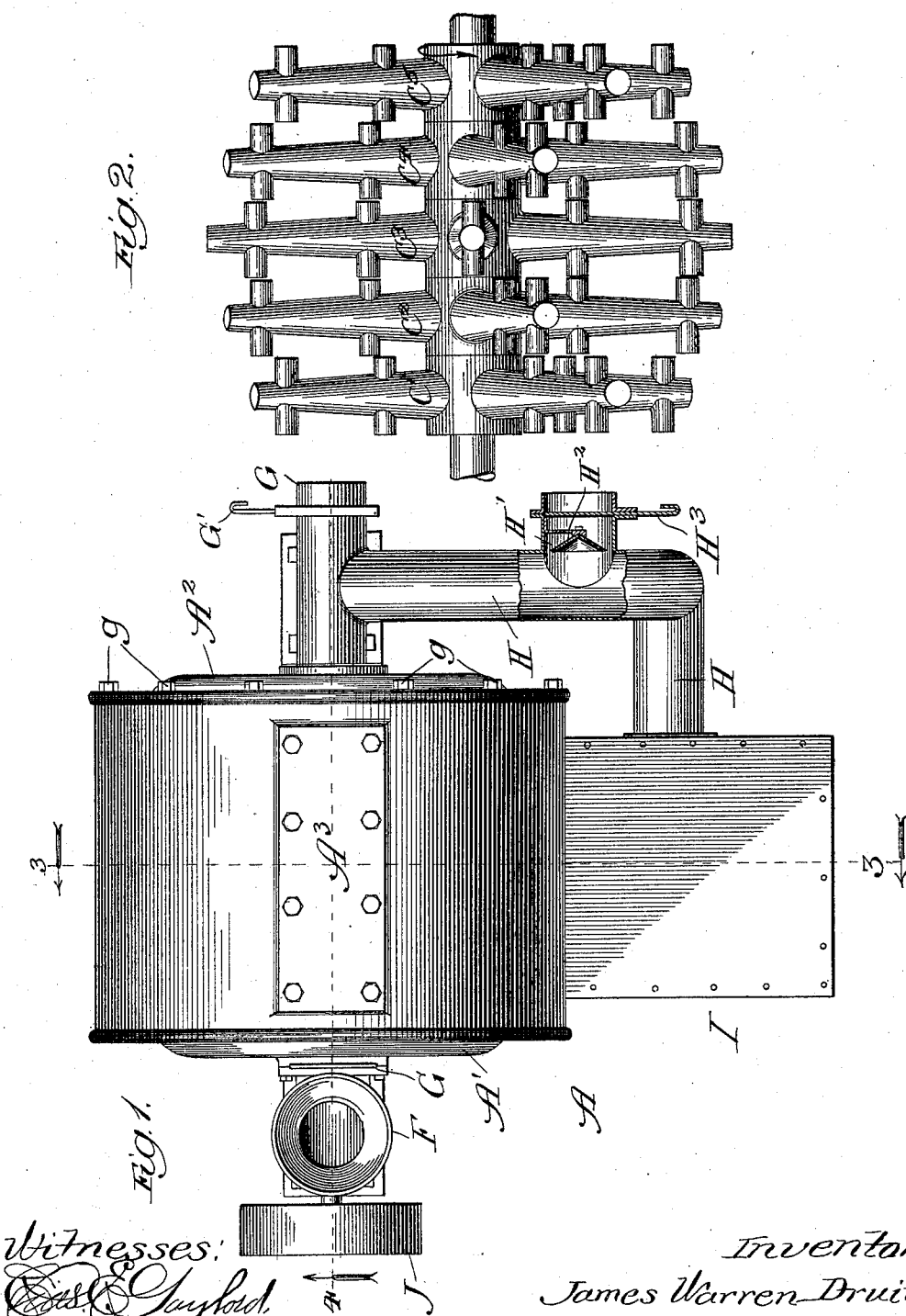

No. 683,256. Patented Sept. 24, 1901.
J. W. DRUITT.
PULVERIZING MILL.
(Application filed July 14, 1900.)
(No Model.) 3 Sheets—Sheet 2.

Witnesses: Inventor:
James Warren Druitt,

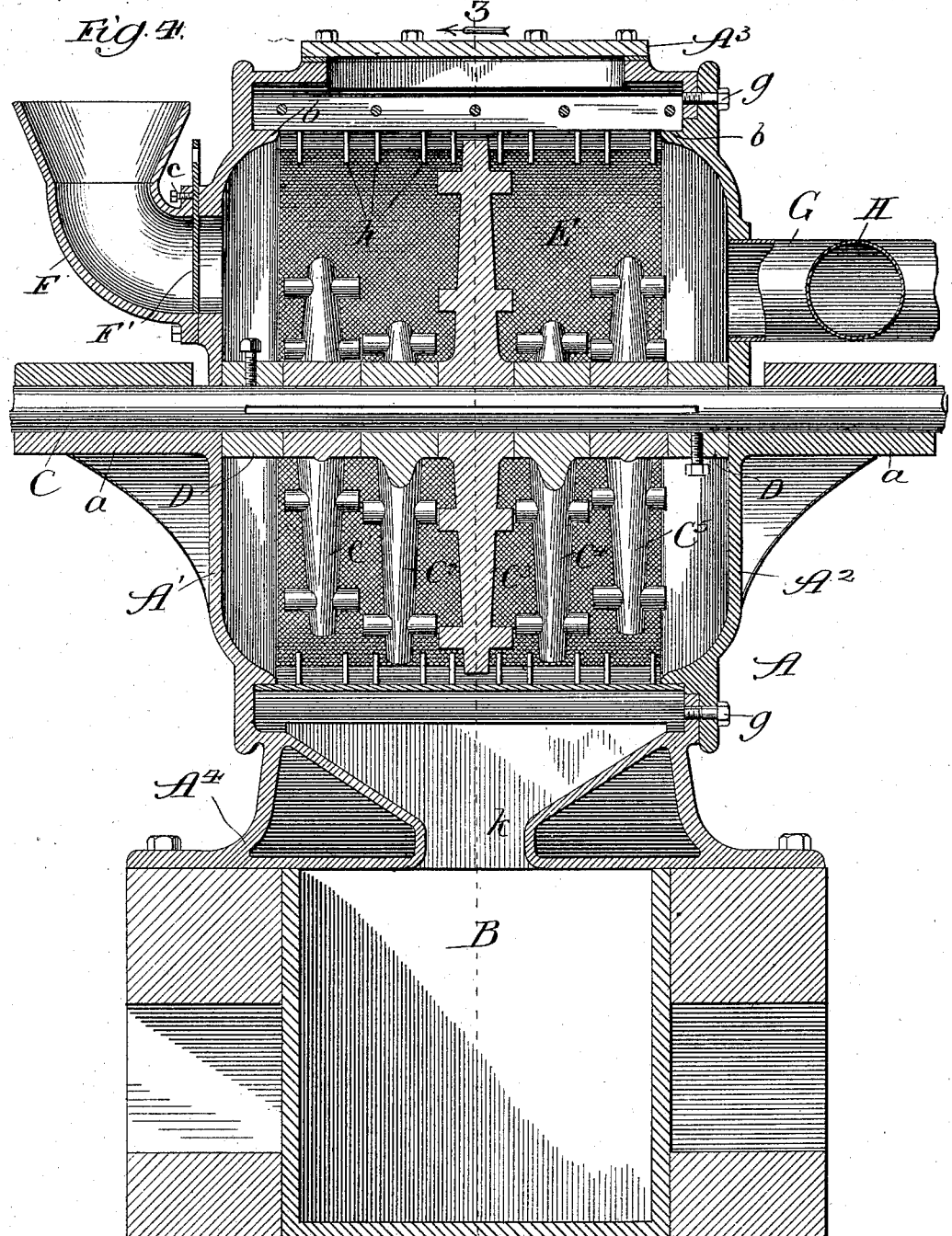

UNITED STATES PATENT OFFICE.

JAMES WARREN DRUITT, OF OAKPARK, ILLINOIS.

PULVERIZING-MILL.

SPECIFICATION forming part of Letters Patent No. 683,256, dated September 24, 1901.

Application filed July 14, 1900. Serial No. 23,633. (No model.)

*To all whom it may concern:*

Be it known that I, JAMES WARREN DRUITT, a citizen of the United States, residing at Oakpark, in the county of Cook and State of Illinois, have invented a new and useful Improvement in Pulverizing-Mills, of which the following is a specification.

My invention relates particularly to machines for finely pulverizing cereals, granulated sugar, or other granular material.

My object is to provide a machine of this character of simple and generally improved construction and perfectly adapted to perform its functions.

In the accompanying drawings, Figure 1 is a plan view of my improved machine in its preferred form, a portion being broken away to show an eduction air-valve; Fig. 2, a broken plan view showing the construction and arrangement of the beater-arms employed; Fig. 3, a transverse vertical section at the corresponding line of Figs. 1 and 4, and Fig. 4 a longitudinal vertical section at the corresponding line of Figs. 1 and 3.

A represents a cylindrical casing having a fixed end $A'$, a removable end $A^2$, a removable hand-hole cover $A^3$, and a base portion $A^4$; B, a box-like pedestal or bin which supports the casing and to which the latter is rigidly fixed; C, a rotary beater-shaft journaled in bearings $a$ on the casing ends; $C'$, $C^2$, $C^3$, $C^4$, and $C^5$, beater-sections keyed at their central hub portions to the shaft; D, adjustable collars fixed to the shaft by set-screws and bearing against the inner surfaces of the casing ends; E, a cylindrical sieve or screen supported upon flanges $b$ on the inner surfaces of the casing ends and concentric with the shaft; F, a feed-inlet guarded by a valve $F'$, adjustably fixed by a set-screw $c$; G, an air-inlet pipe guarded by a valve $G'$, and H an air-outlet pipe having a branch pipe $H'$ guarded by a hollow conical shield or deflector $H^2$ and a manually-adjustable valve $H^3$, the pipe H being continued past the branch pipe $H'$ and united with the pipe G to form a return-circuit for the pulverulent material collected by the device $H^2$.

The deflector $H^2$ is shown in cross-section in Fig. 1 and comprises a concave disk having its concave surface turned inwardly, the disk being of less diameter than the pipe in which it is supported, thereby allowing the air to pass its periphery.

The part E comprises two perforated sections $d$ and $d'$, a connecting binding-plate $d^2$ and coacting binding-strips $d^3$, teeth or projections $d^4$ on the inner surface of the plate $d^2$, and binding-plates $f$ and $f'$, provided with outturned adjacent flanges $f^2$, joined by bolts $f^3$. The casing end $A^2$ is secured by bolts $g$, and it will be understood that the part E is firmly secured upon the flanges which support it by means of the bolts $f^3$, after the internal parts are in place and before the cover $A^3$ is in place. The plates $f$ and $f'$ are provided on their inner surfaces with teeth or projections $h$, as shown.

Each beater-section comprises, as here shown, a hub and four radial beater-arms of the form of frustums of cones, tapering outwardly, each arm being supplied with cross-lugs, as shown. The beater-sections are so arranged on the shaft that starting from the outer sections the sections successively lag behind as the center is approached. In other words, any given arm of the center section may be assumed as a base-arm, from which proceed spiral wings extending in advance of (in the direction of rotation) the base-arm, each wing comprising the successively-advanced corresponding arms of the sections at one side of the central section. The teeth of the binding-plates are so disposed as to allow the ends of the beater-arms to pass between them, as appears from Fig. 4.

The cylindrical sieve E forms, with the cylindrical wall of the casing, an annular channel, through which the pulverized material passes to a discharge-passage $k$, leading to the receiving bin or box B. The bin is provided with an extension I, having a removable cover, whereat the pulverized material may be removed.

In operation the beater-shaft is rotated at a very high rate of speed, and the disposition of the beater-arms at the feed end of the machine is such as to draw the material into the machine and hurl it into the path of the beater-arms at the opposite end of the machine, the latter arms in turn tending to return it to the center of the machine. Thus the particles are hurled together and their reduction greatly facilitated by mutual attrition. The tendency of all the arms is to hurl the material toward the screen, and the beater as a whole acts as a fan which draws air in through the pipe G and employs it as a current for forcing the material through the screen and into the bin B. This current of air serves to maintain a cool temperature within the machine. The pipe H leads from the bin extension I and air passes through the said pipe, some escaping past the collecting device at H' and some being recirculated through the machine and serving to carry back the collected material. The relative proportions of recirculation and of circulation of fresh cool air will be regulated by the valves G' and H³. In this connection it is noteworthy that the ends of the casing A are dished outwardly, so that air-passages of considerable cross-section are afforded outside the end beater-sections.

Power may be applied to the beater-shaft in any suitable manner. In Fig. 1 I have shown a pulley J, through the medium of which the shaft may be rotated.

The feature of having one end of the casing removable and the screen supported as described is very important, as the changing of screens to regulate the fineness of pulverizing is thereby greatly facilitated. The bolts $f^3$ at the end of the screen adjacent to the removable casing end may be loosened, thereby allowing the screen end to expand, and thereafter the casing end can be removed for access to the interior of the screen. When the screen is to be replaced, it can be readily withdrawn in its annular from after first loosening the bolts $f^3$ at each end of the screen.

Changes in details of construction within the spirit of my invention may be made.

What I claim as new, and desire to secure by Letters Patent, is—

1. In a machine of the character described, the combination of a casing having ends provided on their inner surfaces with annular shoulders, one of said casing ends being removable, an annular screen having a longitudinal joint whereat the margins are detachably connected, said screen being secured to said shoulders and forming with the inclosing wall of the casing an annular space, a removable hand-plate for the casing adjacent to said joint, and a rotary beater within said screen, substantially as and for the purpose set forth.

2. In a machine of the character described, the combination of a cylindrical casing having one integrally-formed end provided on its inner surface with an annular shoulder, a removable end for the casing provided on its inner surface with an annular shoulder, an annular screen having a longitudinal joint whereat the margins are detachably connected, said screen being wrapped upon said shoulders, bolt connection at the meeting margins of said screen, a removable hand-hole cover applied to the cylindrical portion of the casing adjacent to said joint, and a rotary beater within the screen, substantially as and for the purpose set forth.

3. In a machine of the character described, the combination of a casing, a screen supported between the ends thereof and forming with the inclosing-casing walls an annular chamber, and a rotary beater within said screen, said beater being supplied with radial beater-arms arranged in sets, each having a central arm and flanking arms arranged successively in advance of each other as the casing ends are approached, whereby the arms tend to hurl the material to the longitudinal center, substantially as and for the purpose set forth.

4. In a machine of the character described, the combination of a casing, a screen, a rotary beater, a feed-inlet, an air-inlet, a receptacle for the finished pulverized material, an air-outlet connected with said receptacle, and a dust-collecting device at said outlet comprising a centrally-located outwardly-dished disk of less diameter than the outlet, substantially as and for the purpose set forth.

5. In a machine of the character described, the combination of a casing, a screen, a rotary beater, a feed-inlet, an air-inlet, a receptacle for the finished pulverized material, an air-outlet connected with said receptacle, a dust-collecting device at said outlet, and a return-pipe connecting said outlet-pipe with said casing and serving to conduct air and carried-over material back to the machine, substantially as and for the purpose set forth.

JAMES WARREN DRUITT.

In presence of—
D. W. LEE,
A. D. BACCI.